Figure 1:
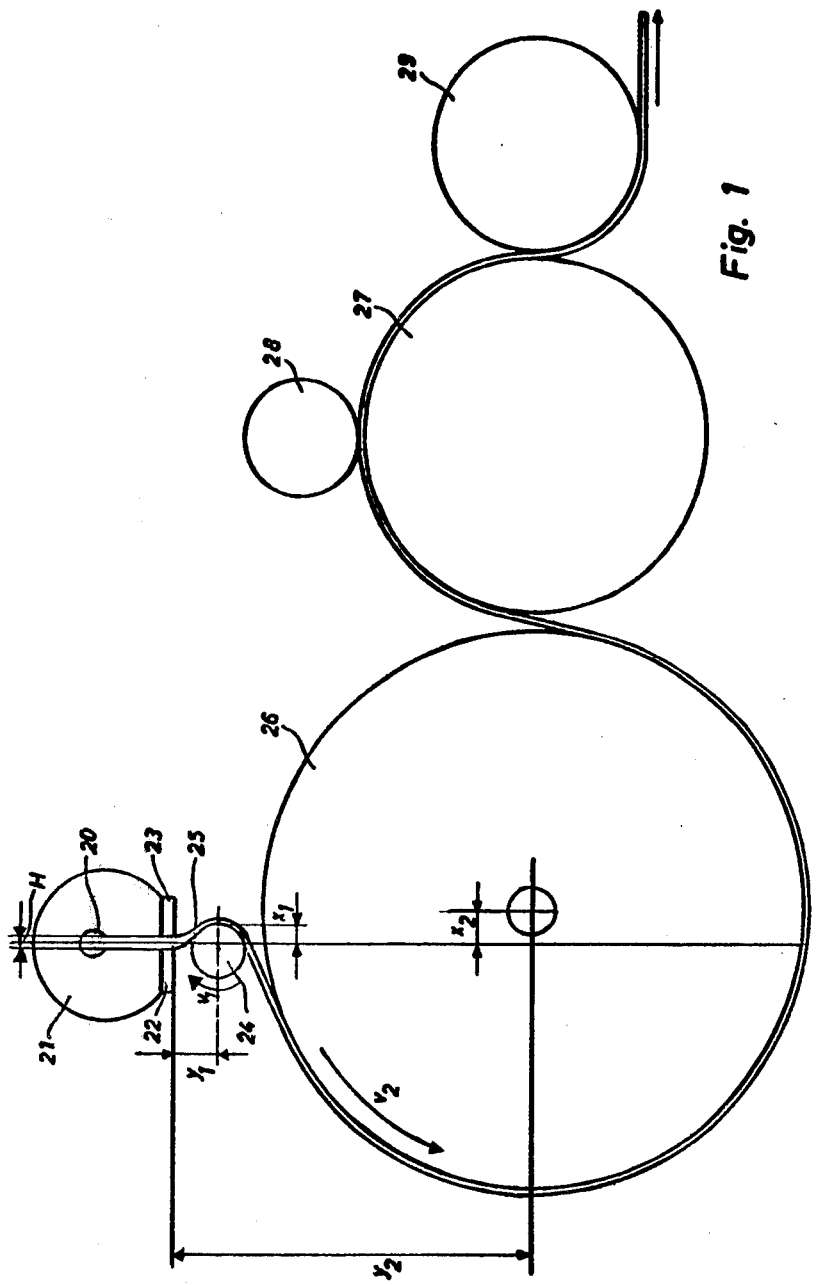

United States Patent [19]

Van Cappellen

[11] 4,066,729
[45] Jan. 3, 1978

[54] EXTRUSION METHOD AND APPARATUS

[75] Inventor: Jan Baptist Van Cappellen, Berchem, Belgium

[73] Assignee: AGFA-Gevaert, N.V., Mortsel, Belgium

[21] Appl. No.: 506,574

[22] Filed: Sept. 16, 1974

Related U.S. Application Data

[63] Continuation of Ser. No. 319,015, Dec. 27, 1972, abandoned, which is a continuation-in-part of Ser. No. 43,484, June 4, 1970, abandoned.

[30] Foreign Application Priority Data

June 4, 1969 United Kingdom ............... 28315/69
Sept. 5, 1969 United Kingdom ............... 44042/69

[51] Int. Cl.² ............................................. B29D 7/24
[52] U.S. Cl. ................... 264/169; 264/210 R; 264/216; 264/237; 425/224; 425/325; 425/379 R
[58] Field of Search ............... 264/212, 213, 216, 237, 264/280, 176 R, 40, 210 R, 40.1; 425/224, 325, 71, 379

[56] References Cited

U.S. PATENT DOCUMENTS

| | | | |
|---|---|---|---|
| 2,212,770 | 8/1940 | Foster | 264/212 |
| 2,364,435 | 12/1944 | Foster et al. | 264/216 |
| 2,799,896 | 7/1957 | Grow et al. | 264/176 R |
| 2,936,492 | 5/1960 | Swerlick et al. | 264/176 R |
| 3,175,026 | 3/1965 | James | 264/212 |
| 3,194,866 | 7/1965 | Gibson et al. | 264/213 |
| 3,397,263 | 8/1968 | Werner | 264/216 |
| 3,471,606 | 10/1969 | Corbett et al. | 264/237 |

Primary Examiner—Jeffery R. Thurlow
Attorney, Agent, or Firm—William J. Daniel

[57] ABSTRACT

A process and apparatus for making relatively thin amorphous film in which a molten film, which is extruded from a slot orifice, is drawn over a cooled control roller spaced from the orifice at its point of contact with said film at a distance not more than about 20 mm before it is received on a quenching drum maintained at conventional quenching temperature below the solidification range of the molten film, the speed of rotation of the quenching drum is in excess of the rate of extrusion of the molten film, the diameter of the control roller is less than one-quarter of the diameter of the quenching drum, and the temperature of the film control roller is maintained at least about ambient room temperature but less than the quenching drum temperature to thereby provide a skin at the directly proximate stratum of film contacting the control roller surface.

8 Claims, 12 Drawing Figures

EXTRUSION METHOD AND APPARATUS

This application is a continuation of application Ser. No. 319,015 filed Dec. 27, 1972 which in turn is a continuation-in-part of copending application Ser. No. 43,484 filed June 4, 1970, both of which are now abandoned.

This invention relates to a method and apparatus for making organic polymeric film by extrusion and is especially concerned with the production of relatively thin film of amorphous polymer.

In an extrusion type process of making polymeric film, the molten polymer is extruded as a film through a slot-like orifice and the extruded polymer film is received on a quenching drum where the temperature of the film is lowered through the softening range of the polymer.

The thickness of the extruded film leaving the extrusion orifice can be reduced by longitudinally stretching the molten film. In this way, film of substantially less thickness than the actual thickness of the extrusion orifice can be produced. This is of importance in the manufacture of thin films, say less than 0.3 mm in thickness, because, if the width of the extrusion orifice were as small as that, difficulties would arise due to the high pressure of the polymer in the extrusion head and the occurrence of so-called die lip streaks in the film. By stretching the extruded film both longitudinally and transversely while the polymer is at the lower end of the softening range, somewhat above its first order transition temperature, the polymer can be subjected to molecular orientation leading to an improvement in various physical properties of the film, notably its tensile strength.

A disadvantage accompanying the reduction the thickness of a film by effecting longitudinal stretching in the gap between the extrusion orifice and the quenching drum as hitherto proposed is a more or less symmetrical lateral contraction of the molten film, known as "necking-in." This lateral contraction of the film reduces the effective film width and the greater the extent of lateral contraction, the greater is the so-called "edge loss," i.e., the loss of material involved in cutting off the thickened film margins which result from the contraction, as will be more fully explained later.

Attempts to reduce the "necking-in" by supporting the film in the air gap by supports which are in adherent contact with the film end edges do not give good results for high stretch ratios.

The present invention provides a way of eliminating or at least reducing this disadvantage.

According to the present invention, the method of producing film comprises extruding molten polymeric material through a slot orifice to form a molten film, longitudinally stretching the extruded film by drawing the film away from the extrusion orifice at a rate exceeding the extrusion speed before the film is received on a quenching surface, and contacting the film between the extrusion orifice and the quenching surface over its full width with a cooled surface, the temperature of such surface, its spacing from the extrusion orifice and the coefficient of friction between the film and such surface being such that the extruded film contacts such surface while still in molten condition but is immediately restrained thereby against lateral contraction or "necking-in."

For convenience, the term "control surface" will hereafter be used to denote the surface on which necking-in is arrested.

The longitudinal stretching of the film occurs at least substantially entirely within the gap between the extrusion orifice and the point of initial contact of the film with the control surface. In order to realize the full potential advantage of the invention, it is clearly desirable for this gap to be smaller than the gap which exists in conventional apparatus between the extrusion orifice and the quenching surface. It is common practice to receive the extruded film on a quenching drum disposed so as to draw the extruded film along the plane of symmetry of the extrusion lips. The size of the quenching drum is such that in those circumstances this gap is at least 40 mm. When carrying out the invention, the gap between the extrusion orifice and the position at which the film contacts the control surface is preferably not more than 20 mm.

While it may be possible in certain circumstances to obtain useful results with a stationary control member, it is presently by far preferred in all cases to use a driven rotary control member. Indeed, unless the distance between the point at which the film leaves the control surface and the point at which the film contacts the quenching surface is negligible, the control surface must be the peripheral surface of a driven rotary control member, e.g., an endless band or a roller, so that this control member can be wholly or mainly responsible for the longitudinal stretching of the film, bearing in mind that substantially no necking-in of the film should occur downstream of the control member.

The quenching surface may be the surface of a driven rotary member, e.g., a belt or drum. Preferably a drum is used and, assuming that a driven control roller is employed and is driven at a peripheral speed in excess of the linear speed of extrusion of the molten polymer, the peripheral speed of rotation of the drum should preferably be the same as or only slightly higher than the peripheral speed of rotation of the control member. The function of the quenching surface is to lower the temperature of the entire film below its softening range. Instead of a single quenching member, there may be used a plurality of quenching members arranged in series, e.g., two or more quenching drums arranged so that the film passes from one quenching drum to another. As employed here, the term "quenching surface" is meant to include a surface formed in part by the surface of one drum and in part by the surface of a succeeding drum or drums.

In order that the stretching gap between the extrusion orifice and the point of contact of the extruded film with a rotary control member can be substantially less than the stretching gap between the extrusion orifice and the point at which the extruded film contacts the quenching drum in a conventional apparatus, the radius of curvature of the control surface must be much smaller than the radius of any quenching drum employed in a conventional apparatus. According to preferred embodiments of the present invention, a driven rotary control roller is disposed between the extrusion orifice and a quenching drum and the diameter of the control roller is less than one half, and preferably less than one quarter, of the diameter of any quenching drum employed. Optimally the diameter of the control roller is less than one tenth of the diameter of the quenching drum.

In order that necking-in shall be arrested on the control surface, heat must be rapidly removed from the film in the relatively short time of contact of the film with this surface. This means that the control surface must be cooled and must have a high heat conductivity. In preferred embodiments of the invention employing a control roller and a quenching drum, the control roller is continuously cooled by circulation of a fluid coolant through the roller and the heat conductivity of the roller is appreciably higher than the heat conductivity of the quenching drum. The smaller the diameter of the control roller, the greater must be the rate of effective heat removal from the film. On the other hand, the film should not be cooled by contact with the control roller so rapidly that cooling rimples appear on the film, at least if high quality thin film such as is required for photographic film base, is being produced.

As indicated by the relative dimensions of the control roller and quenching drum described above, only a small proportion of the total cooling of the film is accomplished on the control surface. Indeed, it is believed that as little as about 5% of the total cooling is actually provided by this surface. The essential function of the control surface with respect to cooling thus is apparently to cool the directly proximate stratum of the film to solid condition to form on that side of the film a kind of "skin" which gives the requisite type of contact with the control surface, as explained below, and permits the film to peel away therefrom without sticking. The average temperature of the film as a whole presumably remains above the melting point of the polymer until contact is made with the quenching drum where the main cooling action takes place.

Apart from the cooling action of the control surface, another important factor is the provision of slip-resisting frictional contact between the film and this surface. It is preferred to avoid exerting any excess pressure, either by air blast or otherwise, against the side of the film opposite to that in contact with the control surface. There is no need for such excess pressure if there is sufficient arc of contact between the film and the guide surface. The normal pressure of the film on the control surface increases as the radius of the contact arc decreases and a particular advantage of selecting a relatively small diameter roller for the control member, as mentioned above, is the fact that the necessary frictional restraint can be established by a relatively short contact arc, e.g., an arc subtending an angle of 180° or less. Obviously, the smaller the frictional forces required in any given case, the greater is the cooling action of the control member. The temperature of the control member is preferably in all cases less than the temperature of the quenching surface where it is first contacted by the extruded film.

The required angular extent of contact of the film with the control roller is achieved by appropriate location of the quenching drum in relation to the control roller. The control roller is preferably itself so situated relative to the extrusion orifice that the path of the extruded film between the extrusion orifice and the control roller does not sharply deviate from the plane of symmetry through the extrusion orifice. This condition is desirable so as to avoid die lip streaks.

The invention has special utility for the production of thin polymer film (less than 0.3 mm in thickness) in a process using a stretch ratio of at least 10, particularly where the polymer is polyethylene terephthalate.

By means of the invention, the "edge loss" resulting from the production of polyethylene terephthalate film less than 0.3 mm in thickness can be reduced to below 10%. The term "edge loss" denotes the cross-sectional area of the thickened edge portions or margins of the film divided by the cross-sectional area of the complete film and multiplied by 100, the term "thickened" being used to signify an increase in the thickness of the film of more than 1% from the thickness at the central portion of the film.

The invention also includes apparatus for producing film according to the above-described method, which comprises means for extruding molten polymer as a molten film, at least one quenching drum maintained at a conventional quenching temperature for receiving the extruded film and lowering its temperature below the softening range and disposed intermediate the extrusion orifice and the point of contact of the film with the drum periphery, a driven cooled control roller appreciably smaller in radius than such drum, the control roller being so located in relation to the extrusion orifice and the drum that it can contact the extruded molten polymer film over the full film width and longitudinally stretch the film on its way to the quenching drum. Preferably, the diameter of the cooled roller is less than half or better still less than one quarter the diameter of the quenching drum and ideally the diameter of the cooled roller is less than one tenth the diameter of the drum. Preferably, the length of the unsupported film path between the extrusion orifice and the cooled roller, i.e., the distance through which the film is stretched or stretch gap, is less than 20 mm and the temperature of the control roller surface is less than that of the quenching drum.

Since the invention was especially developed for the production of polyethylene terephthalate film, reference will be made to this specific material in the further description, but it will be understood that the method and apparatus according to the invention may be used for the extrusion of other polymeric films as well. Thus, the invention can also be employed in the extrusion of normally solid polymers of ethylenically unsaturated substances, such as thermoplastics polymers of mono olefinic lower molecular weight, aliphatic hydrocarbons including polyethylene, polypropylene, copolymers thereof, and the like, as well as other thermoplastic substances such as polymers of vinyl chloride, cellulosic polymers, polyamides, polystyrenes, etc.

Figure 2:
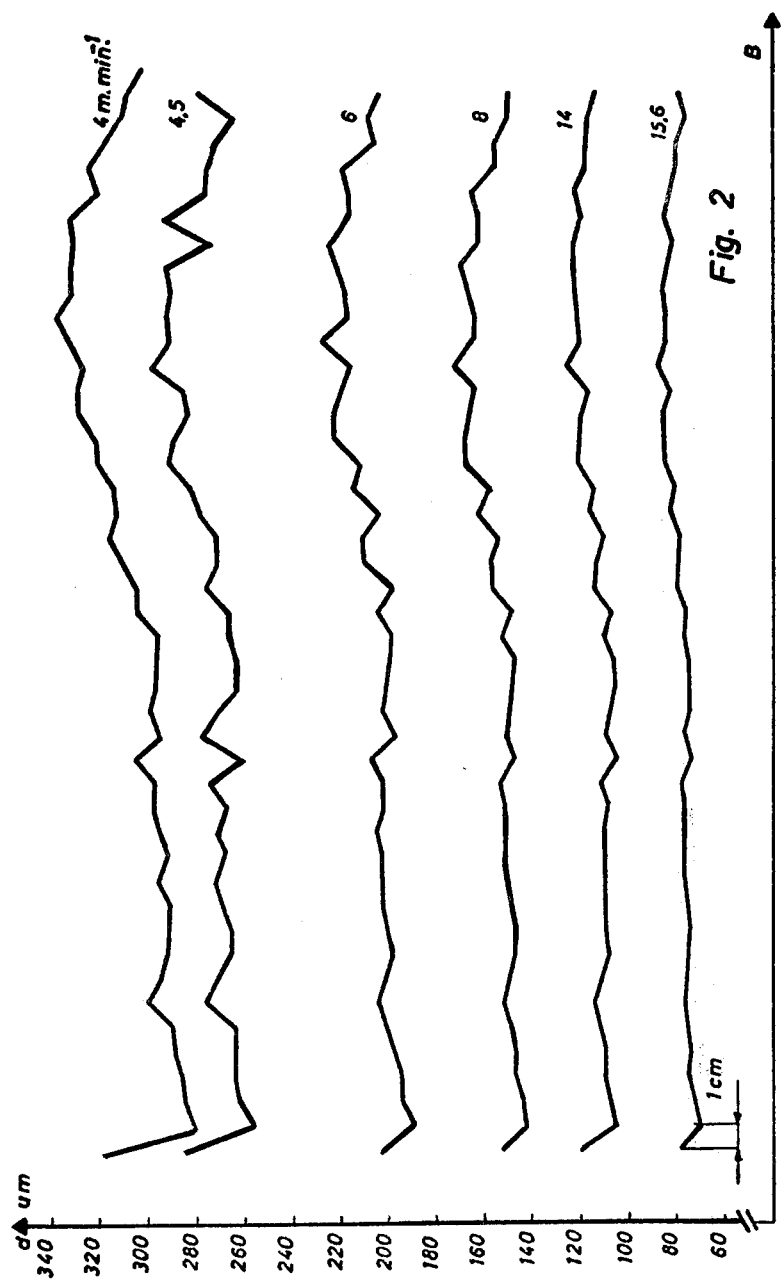
Figure 3:
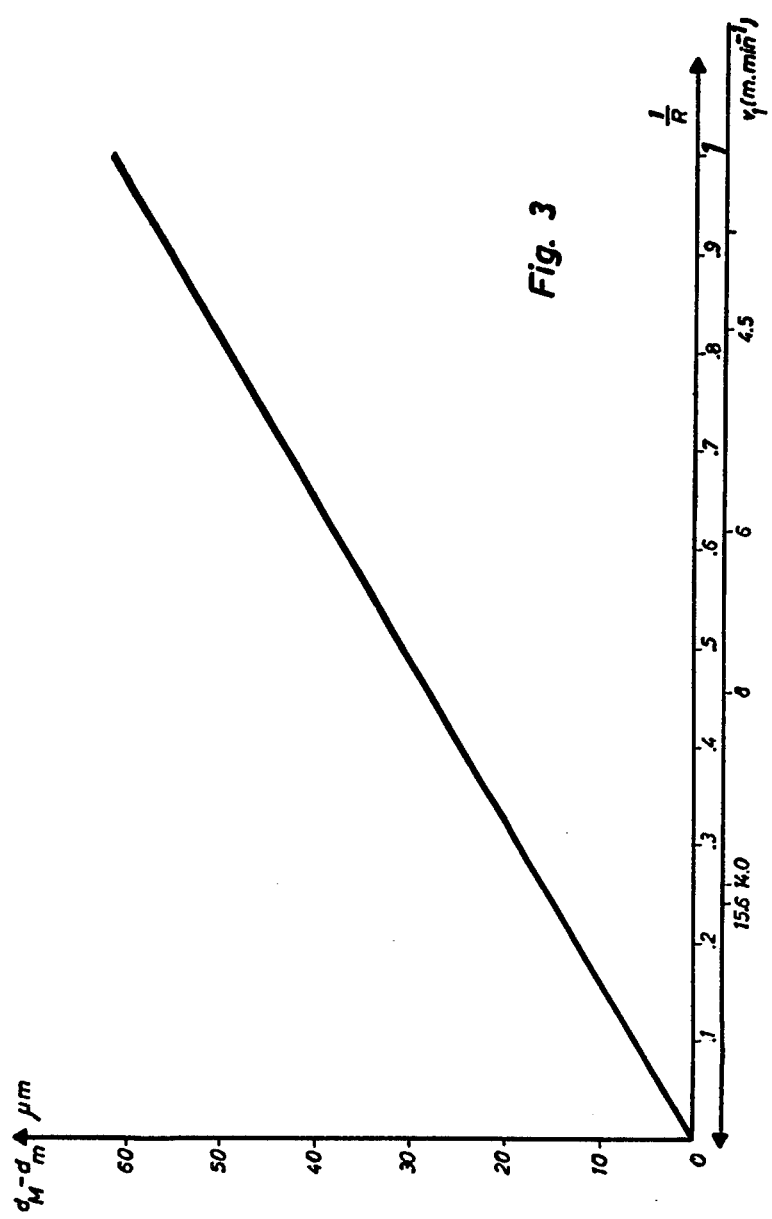
Figure 4:
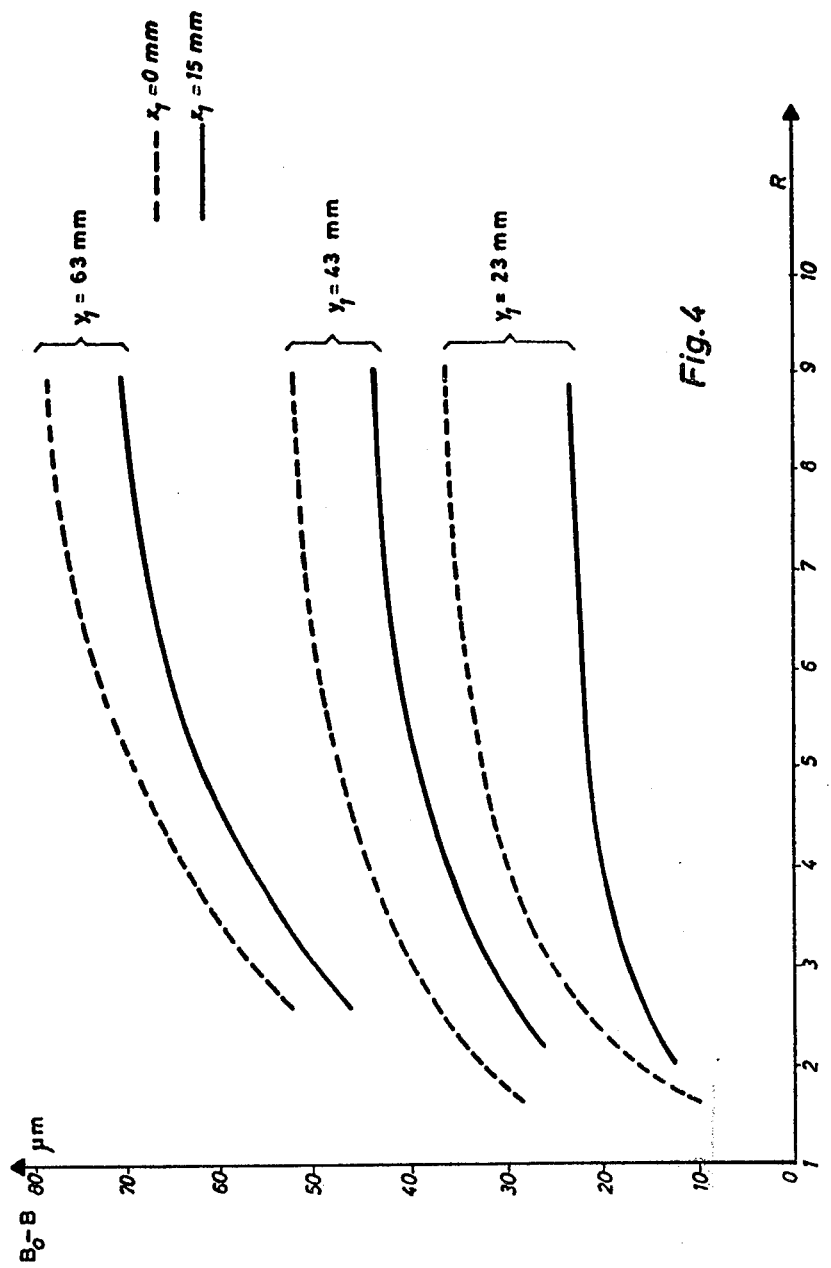
Figure 5:
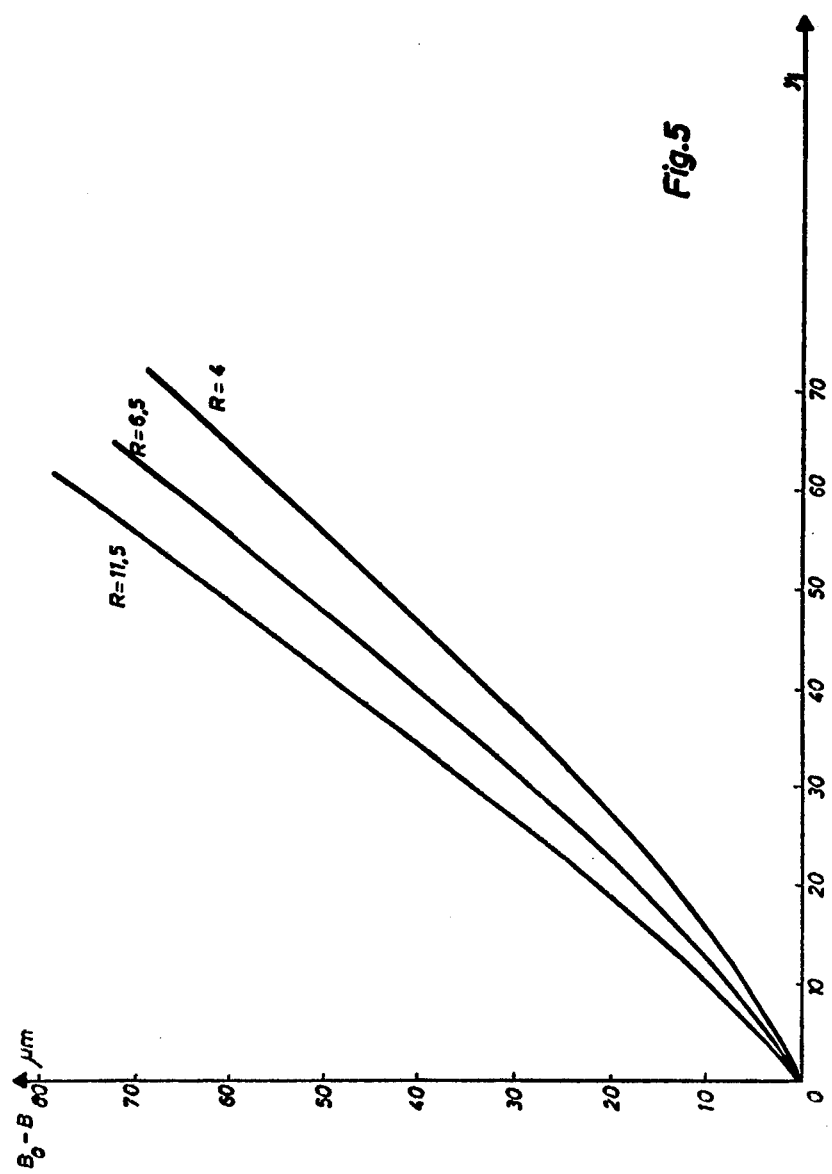
Figure 6:
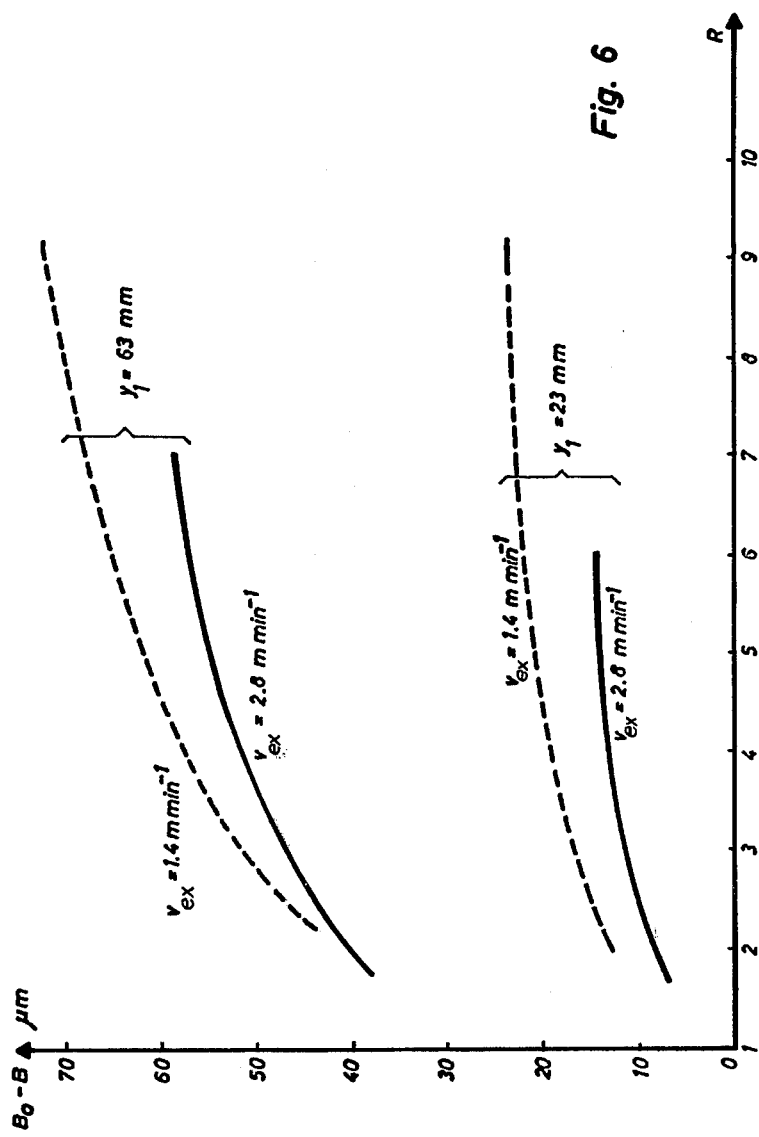
Figure 7:
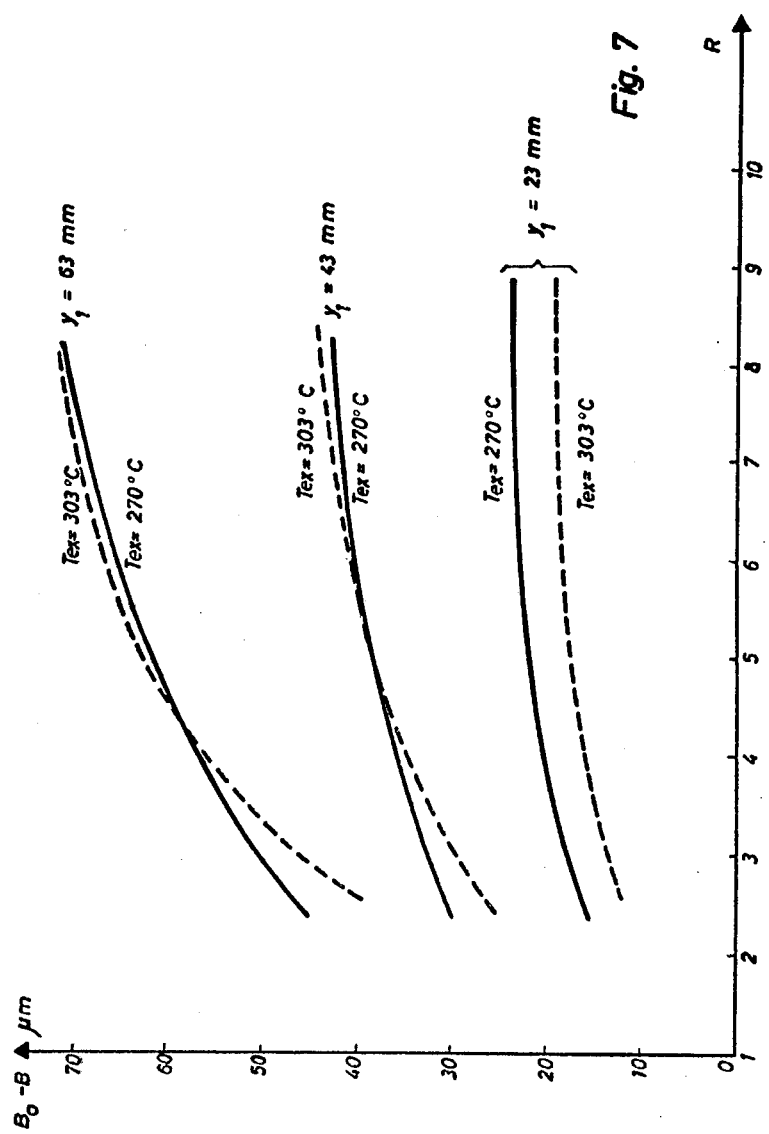
Figure 8:
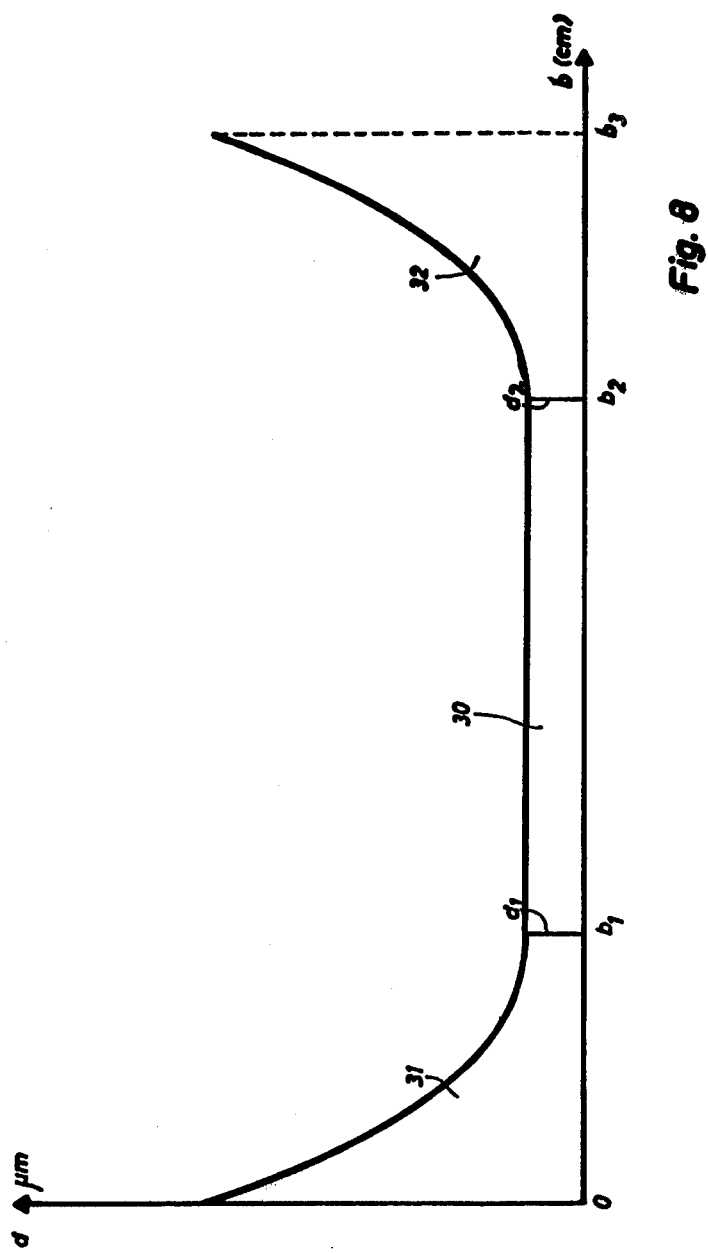
Figure 9:
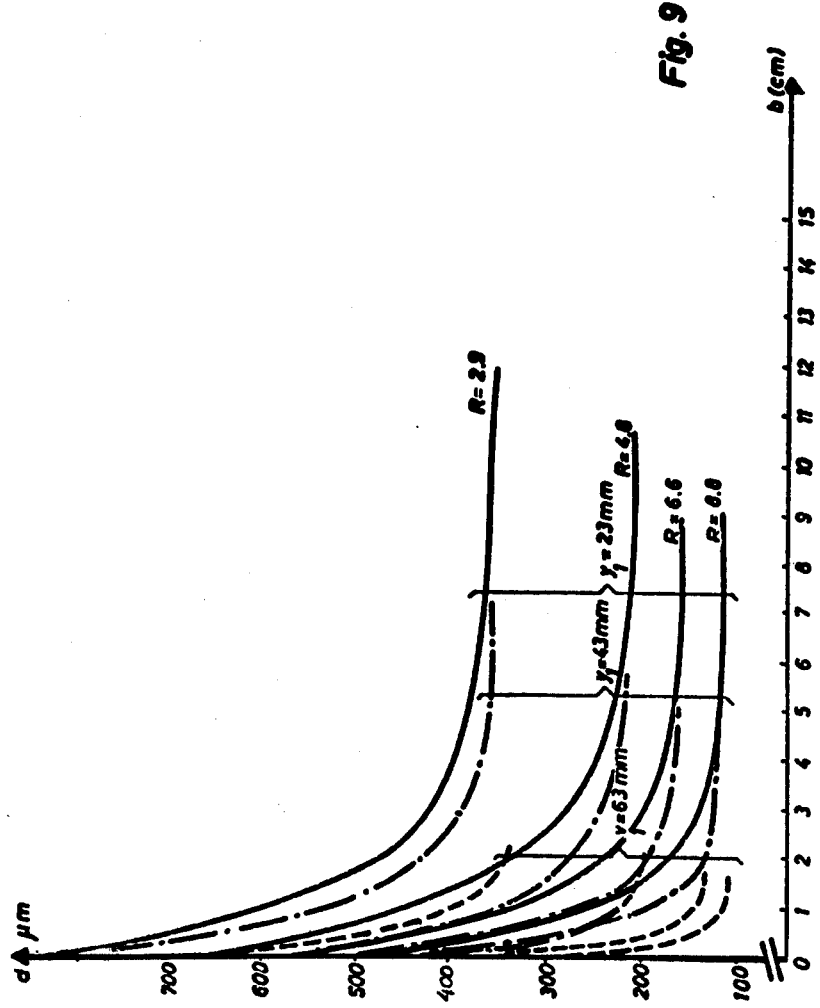
Figure 10:
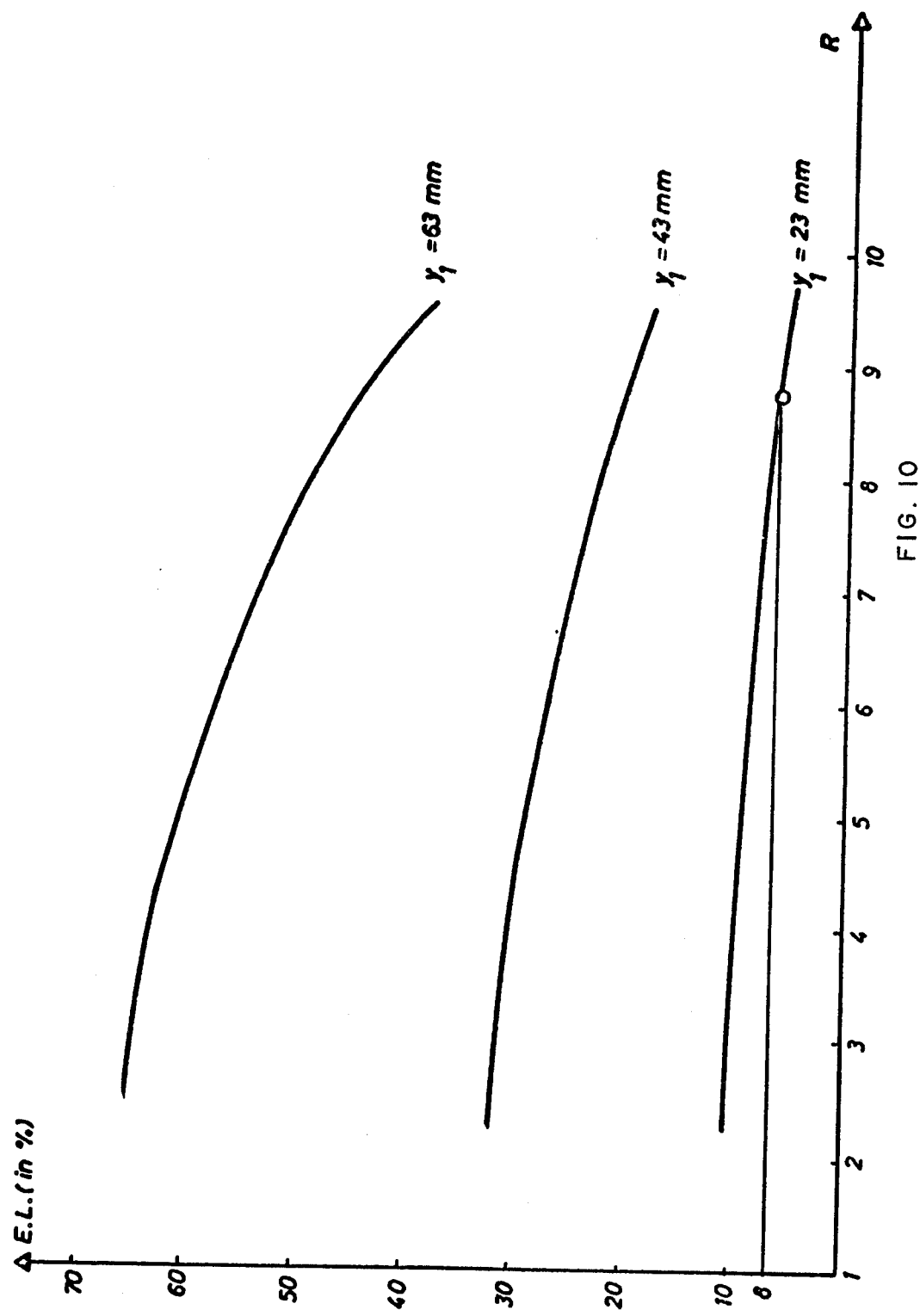
Figure 11:
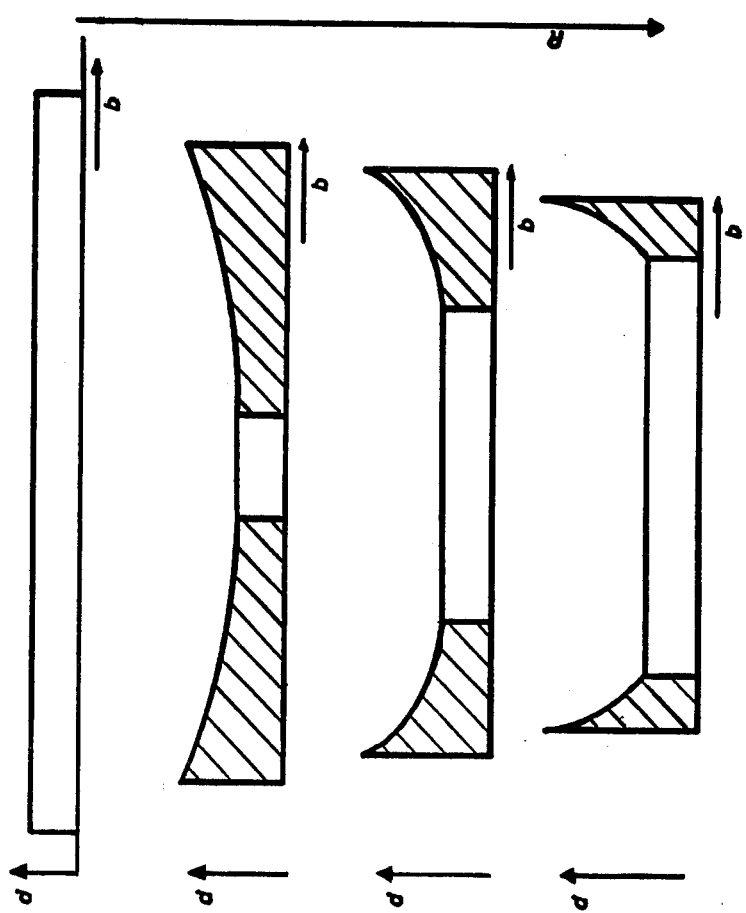
Figure 12:
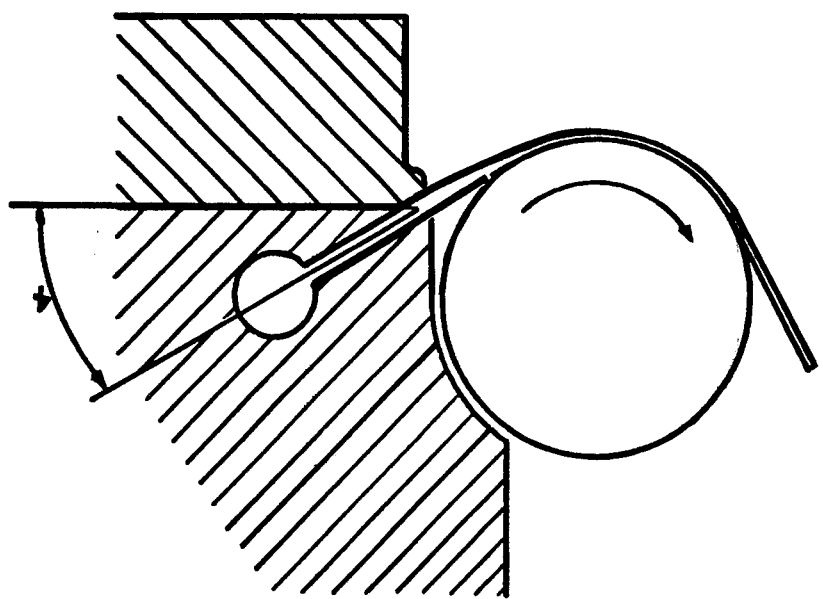

The invention is described more fully hereinafter with reference to the accompanying drawings, in which:

FIG. 1 is a diagrammatic view of an extrusion arrangment according to the invention, FIG. 2 is a diagram of the transverse thickness profile of the film as a function of different peripheral speeds $v_1$ of the control roller, FIG. 3 is a diagram of the thickness deviations as a function of the peripheral speed $v_1$ of the roller, FIG. 4 is a diagram of the necking-in as a function of R, $x_1$ and $y_1$, FIG. 5 is a diagram of the necking-in as a function of $y_1$ and R, FIG. 6 is a diagram of the necking-in as a function of the R, $y_1$ and $v_{ex}$, FIG. 7 is a diagram of the extent of necking-in as a function of R, $y_1$ and $T_{ex}$, FIG. 8 is a cross-sectional view of a necked film, FIG. 9 is a diagram of the thickness profile of the film edges as a function of R and $y_1$, FIG. 10 is a diagram of the edge loss as a function of R and $y_1$, FIG. 11 shows comparative cross-sectional views of films stretched at differing ratios, and FIG. 12 shows a different arrangement of the extrusion head.

Referring to FIG. 1, molten polymer is pumped to the manifold 20 of a conventional slot orifice extrusion head 21. The orifice of the extrusion head is defined by two elongated lips 22 and 23 which are mutually adjustably by means of differential adjustment screws (not shown) or the like, in order to adjust the transverse dimension or thickenss of the opening of the orifice. The molten film is extruded as a curtain 25 almost vertically downwardly into contact with a control roller 24, the deflection of the film by roller 24 from a vertical path being exaggerated in the drawings as illustrated at $x_1$. In passing partially around the film control roller 24, the film turns through an angle of about 90° before moving into tangential engagement with a quenching drum 26. The film is carried on the surface of the drum 26 for an extended portion of its travel and is then fed to a second quenching drum 27. A roller 28 covered with a resilient layer presses the film against the periphery of the drum 27 to insure proper advance of the film. Finally, the film is drawn away over a drum 29 to an appropriate destination.

This destination may be a winding or take-up device, but it may also be, and in the production of polyethylene terephthalate film as described herein usually is, a multiplicity of devices for successive longitudinal and transversal stretching of the film, heat-setting, after-stretching and heat-relaxing, trimming of the thickened edges, coating of the film, etc.

The roller 24 and the drums 26 and 27 are drive through appropriate means at a selected higher peripheral speed than the speed at which the thermoplastic film is extruded from the orifice. Furthermore, the roller 24 and the drums 26 and 27 and the corresponding shafts are hollow for the circulation of a liquid coolant, mostly water, to uniformly cool their respective peripheral surfaces to the desired extent.

The surfaces of the roller 24 and of the drums 26 and 27 are formed of stainless steel, chromium or similar metal having a highly polished and mirror-like finish.

The influence of different operating conditions on the extrusion process is described hereinafter with reference to the extrusion of an polyethylene terephthalate film.

Definition of Symbols

In the following description, a number of different symbols are employed which are defined as follows:

H is the lip opening of the extrusion orifice, $B_o$ is the width of the extrusion orifice, B is the width of the film measured after the film has left the quenching drum 27, d is the thickness of the film measured at the same place as the width B, $x_1$ and $y_1$ are the coordinates of the position of the control roller 24 with respect to the orifice opening which essentially determines the extent of the stretch gap, $x_2$ and $y_2$ are the coordinates of the position of the quenching drum 26 with respect to the orifice opening, $D_1$ is the diameter of the control roller 24 (40 mm in all the examples hereinafter), $D_2$ is the diameter of the quenching drum 26 (800 mm in all the examples hereinafter), $T_{ex}$ is the extrusion temperature, $T_1$ is the surface temperature of the control roller 24, $T_2$ is the surface temperature of the quenching drum 26, $T_3$ is the surface temperature of the quenching drum 27 (25° C in all the examples), $v_1$ is the peripheral speed of the control roller 24, $v_2$ is the peripheral speed of the quenching drum 26, $v_{ex}$ is the linear speed of extrusion, R is the stretch ratio and $= v_1/v_{ex}$, $\eta$ is the inherent viscosity of the polymer (0.59 dl.g$^{-1}$ in all the examples hereinafter), Q is the mass rate of extrusion, $\rho$ is specific density of the polymer (1.33 g.cm$^{-3}$ in all the examples), and X is the degree of crystallization of the quenched film.

Influence of R on the Transverse Thickness Profile of the Film

In the diagram of FIG. 2, different thickness profiles for the film, measured in the transverse direction, are represented as a function of different values of the peripheral speed $v_1$ of the guide roller 24 ranging from 4 to 15.6 m/min. As shown, the thickness profiles relate only to the central zone of the film, the thickened edges being not considered for the moment.

| Conditions Applicable to Data of FIG. 2 | | | |
|---|---|---|---|
| Q | = 50 kgh$^{-1}$ | $v_2$ | = 1.02 $v_1$ |
| $V_{ex}$ | = 3.7 m/min | $T_{ex}$ | = 303° C |
| H | = 3.5 mm | $T_1$ | = 35° C |
| $B_o$ | = 447 mm | $T_2$ | = 60° C |

When the maximum thickness deviations $d_{max}-d_{min}$ over the central zone are plotted as a function of $v_1$, see FIG. 3, it is clear that $d_{max}-d_{min}$ is inversely proportional to $v_1$, or, in other words, the thickness deviations are proportional to 1/R.

This means that the transverse thickness profile improves (although the relative thickness deviation remains generally constant) as the stretch ratio is increased. This is in contrast to a process wherein the reduction of film thickness occurs by narrowing the extrusion opening and wherein the relative importance of deficiencies in the extrusion lips increases as the size of the lip opening decreases.

Necking-in as a function of R, $x_1$ and $y_1$

In the diagram of FIG. 4, necking-in of the film is plotted as a function of the stretch ratio R, for three settings of $y_1$ and for two settings of $x_1$. By changing the vertical position $y_2$ of the quenching drum 26, the gap between the control roller 24 and the quenching drum 26 is kept constant at 3 mm for each setting of $y_1$.

Necking-in, for the present case, is the difference of $B_o-B$, i.e., the change in the overall width of the film before and after stretching.

| Conditions Applicable to Data of FIG. 4 | | | |
|---|---|---|---|
| Q | = 50 kgh$^{-1}$ | $H_2$ | = 1.05 MM |
| $T_{ex}$ | = 303° C | $B_o$ | = 450 mm |
| $T_1$ | = 35° C | $x_2$ | = 13 mm |

-continued

| Conditions Applicable to Data of FIG. 4 | | | |
|---|---|---|---|
| $T_2$ | = 60° C | $y_2$ | = function of $y_1$ |
| $v_{ex}$ | = 1.4 m/min | $v_2$ | = 1.02 $v_1$ |

The curves in broken lines are for a setting of $x_1 = 0$ mm and those in solid lines for a setting of $x_1 = 15$ mm. It is apparent that necking-in greatly depends on the value of $y_1$ and is smallest for a position of the control roller close to the extrusion orifice. As to the influence of $x_1$, it appears that necking-in is smaller for $x_1 = 15$ mm than for $x_1 = 0$ mm. This is explained by the fact that the point of contact of the tangent to the control roller from the extrusion orifice is closer to the orifice for the setting $x_1 = 15$ mm than for the setting $x_1 = 0$ mm.

Referring to FIG. 5 wherein the conditions are the same as those applicable to FIG. 4, except for Q which is 38 kgh$^{-1}$, $v_{ex}$ which is 1 m/min and $x_1$ which is 15 mm, it may be seen that for small values of $y_1$, the influence of R on the necking-in is small.

Necking-in as a Function of R, $y_1$ and $v_{ex}$

In the diagram of FIG. 6, necking-in is plotted as a function of the stretching ratio R for two values of $y_1$ and for two values of $v_{ex}$. The other applicable conditions are as follows:

| | | | |
|---|---|---|---|
| Q | = 50 kgh$^{-1}$ for $v_{ex}$ = 1.5 m/min (broken curve) | | |
| Q | = 100 kgh$^{-1}$ for $v_{ex}$ = 2.8 m/min (solid curve) | | |
| $T_{ex}$ | = 303° C | $v_2$ | = 1.02 $v_1$ |
| $T_1$ | = 35° C | $x_1$ | = 15 mm |
| $T_2$ | = 60° C | $y_1$ | = 63 mm, 23 mm |
| H | = 1.05 mm | $x_2$ | = 13 mm |
| $B_1$ | = 450 mm | $y_2$ | = function of $y_1$ |

The gap between the control roller 24 and the quenching drum 26 is kept constant at 3 mm by changing $y_2$ for each setting of $y_1$ as described before.

It may be seen from the diagram that for a given value of R and $y_1$, necking-in is smaller for a greater extrusion speed.

Necking-in as a Function of R, $y_1$ and $T_{ex}$

In the diagram of FIG. 7, necking-in is plotted as a function of R for three values of $y_1$ and for two values of the extrusion temperature $T_{ex}$.

The other conditions are the same as in connection with FIG. 6, except that $y_1 = 63$ mm, 43 mm or 23 mm, the broken curves are for an extrusion temperature of 303° C and the solid curves an extrusion temperature of 270° C.

It will be apparent that at the lower extrusion temperature, the molten film shows less necking-in than at the high temperature for all values of R when $y_1$ is relatively small and only at small values of R when $y_1$ is relatively large, due no doubt to an increased viscosity of the film at the lower temperature.

Edge Loss as a Function of $v_1$, $x_1$ and $y_1$

As a consequence of necking-in, the film exhibits a characteristic transverse cross-section which is diagrammatically shown in FIG. 8. A central part 30 is present between two thickened edge parts 31 and 32. The width $b_3$ corresponds to the width B as used hereinbefore. The widths $b_1$ and $b_2$ are determined by the loci where the thickness of the film center is increased by 1%. These thicknesses are indicated by $d_1$ and $d_2$.

It should be understood that FIG. 8, as well as FIG. 11 which will be described hereinafter, is a graphic representation of the film thickness only, and that the actual transverse film-section has a symmetrical profile at the lower side of the abcissa of the figure.

The edge loss (E.L.) is given by the formula:

$$E.L. = \frac{\int_0^{b_1} d(b)db + \int_{b_2}^{b_3} d(b)db}{\int_0^{b_3} d(b)db} \times 100$$

$$\simeq \frac{2\int_0^{b_1} d(b)db}{\int_0^{b_3} d(b)db} \times 100$$

Referring to FIG. 9, the thickness profile of the film edges is plotted as a function of R and $y_1$. The other conditions are as follows:

| | | | |
|---|---|---|---|
| Q | = 50 kgh | $B_0$ | = 450 mm |
| $T_{ex}$ | = 303° C | $x_1$ | = 15 mm |
| $T_1$ | = 35° C | $y_2$ | = function of $y_1$ |
| $T_2$ | = 60° C | $x_2$ | = 13 mm |
| $v_{ex}$ | = 1.4 m/min | $v_2$ | = 1.02 $v_1$ |
| H | = 1.05 mm | | |

The curves in broken lines are for a setting of $y_1 = 63$ mm. the curves in dash and dot lines a setting of $y_1 = 43$ mm and the ones in solid lines a setting of $y_1 = 23$ mm. The most important values are summarized in Tables 1, 2 and 3 hereinafter which relate to the settings of $y_1$ of 63 mm, 43 mm, and 23 mm, respectively.

Definitions For Symbols in Tables 1-3

$d_{gm}$ = average thickness over the usuable film zone, i.e., the arithmetic mean thickness over such zone,
$d_r$ = film thickness at the outermost film edge,
$B_r$ = width of thickened edge region,
$B_m$ = width of the usable film zone,
$B_t = B_m + 2B_r$ = total film width after stretching and cooling,
$I_r$ = cross section of thickened edge region determined by graphical integration,
$I_m$ = cross section of the usable film zone,
$I_t$ = total film cross section.

Table 1

| | | | | | | | | | | | |
|---|---|---|---|---|---|---|---|---|---|---|---|
| ($y_1 = 63$ mm) | | | | | | | | | | | |
| $v_1$ | R | $d_{gm}$ | $d_r$ | $\frac{d_r}{d_{gm}}$ | $B_r$ | $B_m$ | $B_t$ | $I_r$ | $I_m$ | $I_t$ | E.L. |
| $\frac{m}{min}$ | — | μm | μm | — | mm | mm | mm | mm$^2$ | mm$^2$ | mm$^2$ | in % |
| 3.9 | 2.9 | 350 | 875 | 2.5 | 120 | 162 | 402 | 51 | 56 | 158 | 64 |
| 6.5 | 4.8 | 220 | 620 | 3 | 110 | 170 | 390 | 31 | 37 | 98 | 62 |

Table 1-continued

| $v_1$ | R | $d_{gm}$ | dr | $\frac{dr}{d_{gm}}$ | $B_r$ | $B_m$ | $B_t$ | $I_r$ | $I_m$ | $I_t$ | E.L. |
|---|---|---|---|---|---|---|---|---|---|---|---|
| ($y_1$ = 63 mm) | | | | | | | | | | | |
| $\frac{m}{min}$ | — | μm | μm | — | mm | mm | mm | mm² | mm² | mm² | in % |
| 8.8 | 6.6 | 160 | 525 | 3.3 | 90 | 205 | 385 | 20 | 33 | 72 | 54 |
| 11.7 | 8.8 | 120 | 470 | 3.9 | 70 | 240 | 380 | 12 | 29 | 53 | 45 |

Table 2

| $v_1$ | R | $d_{gm}$ | dr | $\frac{dr}{d_{gm}}$ | $B_r$ | $B_m$ | $B_t$ | $I_r$ | $I_m$ | $I_t$ | E.L. |
|---|---|---|---|---|---|---|---|---|---|---|---|
| ($y_1$ = 43 mm) | | | | | | | | | | | |
| $\frac{m}{min}$ | — | μm | μm | — | mm | mm | mm | mm² | mm² | mm² | in % |
| 3.9 | 2.9 | 350 | 900 | 2.5 | 57.5 | 304 | 419 | 25.6 | 110 | 161 | 32 |
| 6.5 | 4.8 | 220 | 610 | 2.8 | 50 | 312 | 412 | 15.3 | 69 | 99 | 30 |
| 8.8 | 6.6 | 160 | 500 | 3.1 | 38 | 334 | 410 | 9.1 | 54 | 72.5 | 25 |
| 11.7 | 8.8 | 120 | 430 | 3.6 | 30 | 345 | 405 | 6.5 | 42 | 54 | 24 |

Table 3

| $v_1$ | R | $d_{gm}$ | dr | $\frac{dr}{d_{gm}}$ | $B_r$ | $B_m$ | $B_5$ | $I_r$ | $I_m$ | $I_t$ | E.L. |
|---|---|---|---|---|---|---|---|---|---|---|---|
| ($y_1$ = 23 mm) | | | | | | | | | | | |
| $\frac{m}{min}$ | — | μm | μm | — | mm | mm | mm | mm² | mm² | mm² | in % |
| 3.9 | 2.9 | 350 | 830 | 2.3 | 20 | 392 | 432 | 9 | 141 | 169 | 11 |
| 6.5 | 4.8 | 220 | 555 | 2.5 | 18 | 395 | 430 | 6 | 87 | 99 | 12 |
| 8.8 | 6.6 | 160 | 475 | 3.0 | 10 | 408 | 428 | 3 | 66 | 715 | 8 |
| 11.7 | 8.8 | 120 | 405 | 3.5 | 10 | 407 | 427 | 2 | 49 | 52 | 8 |

The most important conclusions to be drawn from the three tables are as follows. At a constant stretching distance, i.e., when $y_1$ and $x_1$ are constant, the width $B_r$ of the thickened edge region decreases with an increasing strength ratio R. At the same tine, the edges become thicker relative to the thickness at the central zone, i.e., the ratio dr /$d_{gm}$ increases. The edge loss (E.L.) decreases with an increasing stretch ratio. At the same stretch ratio R, the thickened edges become less wide, i.e., $B_r$ decreases, as the stretching distance is reduced, i.e., when $y_1$ decreases, and the edge loss is decreased accordingly.

Referring to FIG. 10 wherein the values of the edge loss (E.L.) in the tables are plotted as a function of R for the three settings of $y_1$, it is very clear that for a small stretching gap $y_1$ (e.g., $y_1$ = 23 mm) and a large stretching ratio (e.g., R = 8.8), the waste of material may reach a very low figure, viz., about 8% in the present example. The apparent contradiction between a reduced edge loss notwithstanding the greater necking-in at greater stretching ratios is explained by the cross-sectional view of the stretched film in FIG. 11. Each film section has the same total cross-sectional area, but it can be seen that the area of the edge zones decreases for an increasing stretching ratio R, although the necking-in increases in accordance with R.

As to the influence of extrusion speed on edge loss, it has been noticed that higher extrusion speeds lead to a smaller edge loss. Similarly, the edge loss was smaller when the extrusion temperature was lower, although it should be mentioned that the differences in this respect were very small.

When the crystallization of the stretched and cooled film was measured, a degree of crystallization of only 0.3 to 0.5% was found even for stretching ratios up to 10. This confirms that at temperatures exceeding the melting temperature of the polymer no orientation occurs.

The temperature of the control roller used in the measurements described hereinbefore was 35° C. As pointed out in the introduction of the description, this temperature is not critical and in practice values may be used preferably ranging from ambient room temperature to less than the temperature of the quenching drum.

The temperature of the quenching drum or drums will be determined by the requirements in conventional extrusion processes wherein no use is made of a control roller according to the invention.

In the preceeding description, the ratio $v_2/v_1$ amounted to 1.02. The mentioned difference in speed does not serve the purpose of stretching the film but, on the contrary, was necessary for producing, in the circumstances described, a film free from wrinkles in the longitudinal direction. It will be understood that this specific value is in no way limiting on the invention and that the ratio of the speeds of both rollers may have different values depending on particular working conditions.

In the execution of the method according to the present invention, oligomers will tend to deposit on the surface of the control roller in the form of a thin layer. This layer may become harmful by reducing good thermal contact between the molten film curtain and the roller surface so that the cooling is insufficient, and it may reduce also the sufficient frictional contact of the molten film to the film guide. As a consequence thereof, the effective length of the gap over which the stretching occurs may increase, and the necking-in of the film as well as the edge loss will increase accordingly. Furthermore, the layer may show an insufficient mechanical strength, and poor release from the roller to a smaller or greater degree.

The deposition of oligomers onto the control roller may therefore be prevented by methods known in the art comprising, among others, the continuous application of a thin layer of a liquid heat transfer medium to the control roller, or to the film before it contacts this roller, by spraying, by roller application, etc. The heat transfer material may be an alcohol, glycol, di-glycol, polyglycol, water, used either alone or in combination. If desired, wetting agents may be added to the heat transfer medium to lower its surface tension.

It should be understood, however, that the continuous prevention of the formation of an oligomer layer is not necessarily essential, and in the production of polyethylene terephthalate film of a thickness after biaxial stretching of about 15 μm, it has been found that an oligomer layer which was built up on the control roller 24 to a final thickness of some tenths of a millimeter after 7 to 10 hours, could remain many days before the first traces of deterioration of the layer appeared.

In the practice of the method according to the present invention, it has further been found that the control roller apparently very effectively reduces or eliminates the phenomenon known as "Venetian blind haze." This type of haze is characterized by alternate hazy lines on one surface of the film and is probably due to the entrapment of air between the molten film and the quenching surface.

An improvement in this respect may be obtained when starting with a conventional process using a stretch ratio in the stretching gap of 1, the opening of the extrusion orifice is increased several times without changing the mass of extruded film, a control roller is added as described, and the stretch ratio is increased to the extent needed to produce amorphous film of the same thickness as was originally obtained after removal from the quenching surface. It is believe that when tensioning is applied in this way, the film is effectively drawn against the quenching surface so that virtually no air can be entrapped. An additional advantage is that longitudinal striations are reduced in accordance with the increased orifice opening.

Finally, the extrusion orifice need not have the form of a conventional extrusion head as is shown diagrammatically in FIG. 1, but it preferably has a form as shown schematically in FIG. 12 which permits a reduction of the length of the stretching gap between the extrusion orifice and the transverse line of first contact of the film with the control roller, which is greater than the reduction which is possible by reducing the distance $y_1$ in the arrangment of FIG. 1, or alternatively by reducing the diameter $D_1$ of the control roller.

Additionally, it may be seen in FIG. 12 that the plane of extrusion is inclined at a small angle $\alpha$ to the vertical. This constitutes an improvement over the arrangement shown in FIG. 1 wherein, as a consequence of the deflection imparted to the molten film upon leaving the extrusion orifice, lip wetting may occur at the side nearest the direction of deflection so that impurities adhering to the lip may cause striations on the film surface.

The provision of a sloping film path between the extrusion orifice and the control roller according to FIG. 12 has the advantage that gravity acts in a direction different from the film path so that the contact of the molten film with the control roller is much more stable.

What is claimed is:

1. Method of producing polyethylene terephthalate film which comprises:

a. extruding molten polyethylene terephthalate along an extrusion plane in a generally downward direction through a downwardly opening slot orifice to form a molten film,
   b. stretching the film longitudinally by drawing the film away from the extrusion orifice at a rate faster than the extrusion rate,
   c. progressively delivering said stretched film into contact along one of the film surfaces with the peripheral surface of at least one quenching drum maintained at a conventional quenching temperature below the film softening range to solidify film and rotatably driven continuously in one direction to advance the drum surface substantially at said drawing away rate, said drum being located generally below said slot orifice with the peripheral surface region thereof which initially receives said film extending in one direction generally obliquely through and beyond the extrusion plane, and
   d. in the gap between the extrusion slot and the adjacent peripheral section of said quenching drum surface, passing said film over its full width while still in substantially molten condition and before said one face is contacted with said quenching surface progressively into contact along its opposite face with an arcuate portion of a highly heat conductive smooth polished control surface moving at substantially said drawing away rate in an endless path including said arcuate portion, said arcuate surface portion arcuate surface portion having an angular extent of up to about 180° and sufficient to provide slip-resisting frictional contact between said film and said control surface and a radius of less than one-fourth the radius of the quenching drum and projecting through and beyond said extrusion plane in the opposite direction to said drum to introduce a bow-shaped deflection in the path of said film between said orifice and drum surface, said control surface being maintained at a temperature ranging from about ambient room temperature to a temperature less than that of the quenching surface at the initial point of contact of said film therewith to thereby provide a skin at the directly proximate stratum of film contacting the control surface, the clearance space between said extrusion slot and the intitial point of contact of said film with said control surface being not more than about 20 mm.

2. Method according to claim 1 wherein deposits of oligomers are continuously removed from the control surface.

3. Method according to claim 1 wherein the ratio of said two radii is at least 10:1.

4. The method of claim 1 wherein said film is stretched at a rate at least 10 times faster than the rate of extrusion.

5. Method of producing polyethylene terephthalate film which comprises:

a. extruding molten polyethylene terephthalate in the form of a generally continuous film from a slot orifice at a substantially predetermined rate,
   b. feeding said molten extruded film onto the peripheral surface of a quenching drum in a direction which intersects substantially tangentially with the periphery of said drum, said drum surface being cooled to a conventional quenching temperature below the solidification temperature of said polymeric material, and said drum being rotatably driven to advance the film thereon at a linear rate greater than said rate of extrusion whereby said film is stretched, and c. in the gap between said slot orifice and said drum surface, mechanically deflecting said film while still in molten condition from a rectilinear path between said orifice and drum surface by passing the film while in such gap over its full width partially around a rotatable control roller having a smooth polished surface disposed on the opposite side of said film from said drum and rotated at a linear rate substantially equal to said drum, said roller having a radius less than one-fourth that of said drum and being maintained at a temperature of at least about ambient room temperature but less than said drum temperature at the initial point of contact of said film with said quenching drum to thereby provide a skin at the directly proximate stratum of film contacting said control roller surface, whereby lateral contraction of the film is substantially arrested on said roller, said film being in contact with said control roller over an angle of up to about 180° and sufficient to provide slip-resisting frictional contact between said film and said control roller surface, the clearance space between said extrusion slot orifice and the initial point of contact of said film with said control roller surface being not more than about 20 mm.

6. In an apparatus for forming polyethylene terephthalate films by extrusion along an extrusion plane in a generally downward direction of a molten polyethylene terephthalate through a downwardly opening slot orifice onto the surface of a rotatable quenching drum maintained at a conventional quenching temperature below the solidification temperature of the polymer, said drum being located beneath said orifice with the peripheral surface region thereof initially contacted by said film extending obliquely in one direction through and beyond the extrusion plane, the improvement comprising a continuous smooth polished control surface of a width at least equal to the width of said film and maintained at a temperature of at least about room temperature but less than the temperature of the quenching drum surface at the initial point of contact of said film with said developing drum surface to thereby provide a skin at the directly proximate stratum of film contacting said control surface, said control surface being movable through a continuous path including an arcuate portion with a radius less than one-fourth that of the quenching drum, at least said arcuate path portion being disposed in the gap between said orifice and said quenching surface for contact with the entire surface of the surface of said film opposite said quenching drum and projecting through and beyond said extrusion plane in the opposite direction to said drum to produce a bow-shaped deflection in the film path in said gap of an arcuate extent up to about 180° and sufficient to provide slip-resisting friction contact between the film and said control surface, and means for rotating the quenching drum surface and for advancing said control surface in the same direction as the film in contact therewith and at substantially the same linear speed which is higher than the linear rate of extrusion of said film in order to stretch said film, the clearance space between said extrusion slot and the initial point of contact of said film with said control surface being not more than about 20 mm.

7. Apparatus according to claim 6 wherein the radius of the arcuate portion of said control surface is not greater than 20 mm.

8. Apparatus according to claim 6 wherein the arcuate portion of said control surface has a radius not more than about 1/10 the radius of the quenching drum.

* * * * *